United States Patent Office 3,395,190
Patented July 30, 1968

3,395,190
PURIFICATION OF TRANS-1,2-BIS(3-CYCLO-HEXEN-1-YL)ETHYLENE (BCE)
Donald C. Tabler, Bartlesville, Okla., assignor to Phillips Petroleum Company, a corporation of Delaware
No Drawing. Filed Nov. 7, 1966, Ser. No. 592,275
6 Claims. (Cl. 260—666)

This invention relates to a process for the purification of trans-1,2-bis(3-cyclohexen-1-yl)ethylene, hereinafter designated BCE.

It has recently been found that the compound BCE can be prepared by contacting 4-vinylcyclohexene with a catalyst containing molybdenum and/or tungsten oxides or compounds convertible to the oxides deposited on or admixed with a support comprising silica and/or alumina. The catalytic reaction is conducted at a temperature in the range of 25 to 300° C., preferably 75 to 200° C., using a time in the range of about 0.5 second to 24 hours or longer at a pressure in the range of atmospheric to 1500 p.s.i.g. Further details of the disproportionation process are disclosed in the application of Donald L. Crain, Ser. No. 502,544, filed Oct. 22, 1965, now abandoned. In this process, the selectivity to the desired product is high, about 85 percent, but it is desirable to isolate this compound in a higher purity. However, because the principal by-products of this reaction are essentially isomeric and have similar boiling points, separation and purification by conventional fractional distillation has proven to be very tedious, requiring an unusually efficient distillation column and vacuum equipment. These by-products are generally double bond isomers with some skeletal isomers.

This invention is concerned with a simpler and more effective method for purifying crude BCE than by fractional distillation.

Accordingly, it is an object of the invention to provide an effective process for purification of crude BCE (mixtures of BCE with closely boiling isomers). Another object is to provide a process for purification of crude BCE, particularly the reaction product obtained by disproportionation of 4-vinylcyclohexene, by crystallization. Other objects of the invention will become apparent to one skilled in the art upon consideration of the accompanying disclosure.

A broad aspect of the invention comprises mixing crude BCE with at least one of the solvents methyl ethyl ketone and methyl isobutyl ketone in proportions which permit crystallization of a substantial proportion of the BCE when the resulting mixture is chilled to a low temperature and thereafter chilling the resulting mixture or solution to a sufficiently low temperature to effect crystallization, and recovering the resulting crystals which have a higher concentration of BCE therein than the concentration of this compound in the crude BCE. Methyl ethyl ketone requires a chilling temperature of about −75° F. to about −85° F., while methyl isobutyl ketone is effective in crystal formation in solution in BCE at a temperature of about −50° F. to −60° F. A final chilling temperature is used which produces a substantial crop of crystals. The preferred solvent is methyl isobutyl ketone because of the higher crystallization temperatures provided.

Well known solvents such as methyl, ethyl, and isopropyl alcohols were tested but were not operable.

The amount of solvent to be dissolved in the crude BCE is in the range of about 0.5 to about 5 volumes of solvent or diluent per volume of crude BCE. The resulting solution is then chilled to a crystal-forming temperature in the range of about −70 to 110° F. at any convenient rate and at any convenient pressure which is adequate to maintain the mixture in substantially liquid phase until crystals form. When the solution has been sufficiently chilled to produce a slurry of crystals containing solids in the range of about 5 to 40 percent by volume of the slurry, the solids are separated by conventional means, such as by filtering or centrifuging. The solid phase contains crystals which are substantially enriched in the BCE compound. The enriched solid phase can be subjected to washing or to other crystal purification techniques or it can be remelted and recrystallized from a solution with added ketone solvent in another crystallization stage. Thus, the crystallization and/or crystal purification technique can be repeated until the desired degree of product purity is obtained. Except for the specific crystallization solvents of the invention in combination with the crude BCE and related conditions herein, the crystallization process utilizes the general techniques and apparatus known in the art for similar processes.

In order to illustrate the invention without unnecessarily restricting same, the following example is presented.

Purification of the reaction product of cleavage of 4-vinylcyclohexene containing about 85.2 weight percent of trans - 1,2 - bis(3 - cyclohexen - 1 - yl)ethylene (BCE) was effected by crystallization in methyl isobutyl ketone. The crude BCE contained about 6 weight percent of the cis isomer which remained in the mother liquor. Data from the runs are presented below.

PURIFICATION OF BCE BY CRYSTALLIZATION IN THE PRESENCE OF METHYL ISOBUTYL KETONE
[Three-Stage Process]

| Stage of Crystallization | 1st | 2d | 3d |
|---|---|---|---|
| Solvent in feed, volume percent | 50 | 50 | 50 |
| Temperature of crystallization, °F | −62 | −62 | −63 |
| Solvent-Free Basis: | | | |
| Feed: | | | |
| Volume, ml | 25.0 | 33.2 | 14.5 |
| Area percent, BCE | 85.2 | 89.4 | 92.0 |
| Crystal Cake: | | | |
| Volume, ml | 10.6 | 20 | 10.9 |
| Area percent, BCE | 89.2 | 92.0 | 93.5 |
| Filtrate: | | | |
| Volume, ml | 11.1 | 3.2 | 3.0 |
| Area percent, BCE | 74.3 | 77.4 | 81.0 |
| Material Balance, Out/In ×100: | | | |
| Total Volume | 87.0 | 70.0 | 96.0 |
| BCE | 83.1 | 70.6 | 84.4 |

NOTE.—(1) Feed for 2d stage crystallization was composited from several 1st stage runs. Feed for 3d stage was obtained from crystal product of 2d stage.
(2) Area percent was determined by chromatographic analysis and closely corresponds to weight percent.

Certain modifications of the invention will become apparent to those skilled in the art and the illustrative details disclosed are not to be construed as imposing unnecessary limitations on the invention.

I claim:
1. A process for purifying crude trans-1,2-bis(3-cyclohexen-1-yl)ethylene (BCE) from mixtures with isomers thereof which comprises the steps of:
  (1) dissolving a sufficient amount of at least one solvent of the group methyl ethyl ketone and methyl isobutyl ketone in said BCE to effect substantial crystal formation in step (2);
  (2) chilling the solution formed in step (1) so as to freeze a substantial portion of said BCE therein; and
  (3) separately recovering the crystals of step (2) containing a higher concentration of said BCE than its concentration in said crude BCE.
2. The process of claim 1 wherein said solvent is methyl ethyl ketone.
3. The process of claim 1 wherein said solvent is methyl isobutyl ketone.
4. The process of claim 1 wherein the amount of solvent is in the range of about 0.5 to 5 volumes per volume of BCE.

5. The process of claim 1 wherein said crude BCE is the reaction product obtained by contacting 4-vinylcyclohexene with a catalyst comprising at least one of the oxides of molybdenum and tungsten on a support comprising at least one of silica and alumina under reaction conditions which produce said crude BCE.

6. The process of claim 1 including the steps of:
 (4) melting the crystals recovered in step (3); and
 (5) repeating steps (1), (2), and (3) on the resulting melt to further enrich the BCE content of the resulting crystals.

References Cited

UNITED STATES PATENTS 3,342,884  9/1967  Solomon.

OTHER REFERENCES

H. H. Inhoffen et al., Chem. Ber. 88, pp. 1415–1423, 1955.

N. L. Alleuger et al., J. Amer. Chem Soc., 86, pp. 2811–19, 1964.

DELBERT E. GANTZ, *Primary Examiner.*

VERONICA O'KEEFE, *Assistant Examiner.*